United States Patent
Sanghi et al.

(10) Patent No.: US 11,176,068 B2
(45) Date of Patent: *Nov. 16, 2021

(54) METHODS AND APPARATUS FOR SYNCHRONIZING UPLINK AND DOWNLINK TRANSACTIONS ON AN INTER-DEVICE COMMUNICATION LINK

(71) Applicant: Apple Inc., Cupertino, CA (US)

(72) Inventors: Karan Sanghi, San Jose, CA (US); Vladislav Petkov, Campbell, CA (US); Radha Kumar Pulyala, Santa Clara, CA (US); Saurabh Garg, San Jose, CA (US); Haining Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,743

(22) Filed: Feb. 3, 2020

(65) Prior Publication Data

US 2020/0174953 A1 Jun. 4, 2020

Related U.S. Application Data

(60) Continuation of application No. 16/056,374, filed on Aug. 6, 2018, now Pat. No. 10,552,352, which is a
(Continued)

(51) Int. Cl.
*G06F 13/40* (2006.01)
*G06F 13/28* (2006.01)

(52) U.S. Cl.
CPC .......... *G06F 13/28* (2013.01); *G06F 13/4027* (2013.01); *Y02D 10/00* (2018.01)

(58) Field of Classification Search
None
See application file for complete search history.

(56) References Cited

U.S. PATENT DOCUMENTS 4,805,137 A 2/1989 Grant et al.
4,949,299 A 8/1990 Pickett
(Continued)

FOREIGN PATENT DOCUMENTS

EP 3013008 A1 4/2016
JP 2004086792 A 3/2004
(Continued)

OTHER PUBLICATIONS

ECN L1 PM Substates with CLKREQ approved Aug. 23, 2012.
(Continued)

*Primary Examiner* — Michael Sun
(74) *Attorney, Agent, or Firm* — Sterne, Kessler, Goldstein & Fox P.L.L.C.

(57) ABSTRACT

Methods and apparatus for a synchronized multi-directional transfer on an inter-processor communication (IPC) link. In one embodiment, the synchronized multi-directional transfer utilizes one or more buffers which are configured to accumulate data during a first state. The one or more buffers are further configured to transfer the accumulated data during a second state. Data is accumulated during a low power state where one or more processors are inactive, and the data transfer occurs during an operational state where the processors are active. Additionally, in some variants, the data transfer may be performed for currently available transfer resources, and halted until additional transfer resources are made available. In still other variants, one or more of the independently operable processors may execute traffic monitoring processes so as to optimize data throughput of the IPC link.

18 Claims, 14 Drawing Sheets

Related U.S. Application Data division of application No. 15/011,291, filed on Jan. 29, 2016, now Pat. No. 10,042,794.

(60) Provisional application No. 62/175,174, filed on Jun. 12, 2015.

(56) References Cited

U.S. PATENT DOCUMENTS

| | | | |
|---|---|---|---|
| 4,987,529 A | 1/1991 | Craft et al. | |
| 5,367,688 A | 11/1994 | Croll | |
| 5,467,459 A | 11/1995 | Alexander et al. | |
| 5,485,578 A | 1/1996 | Sweazey | |
| 5,574,849 A * | 11/1996 | Sonnier | G06F 11/1687 714/12 |
| 5,613,086 A | 3/1997 | Frey et al. | |
| 5,659,542 A | 8/1997 | Bell et al. | |
| 5,708,779 A | 1/1998 | Graziano et al. | |
| 5,731,973 A | 3/1998 | Takaishi et al. | |
| 5,850,395 A | 12/1998 | Hauser et al. | |
| 5,903,564 A | 5/1999 | Ganmukhi et al. | |
| 5,943,507 A | 8/1999 | Cornish et al. | |
| 6,216,178 B1 | 4/2001 | Stracovsky et al. | |
| 6,233,702 B1 | 5/2001 | Bunton et al. | |
| 6,260,152 B1 | 7/2001 | Cole et al. | |
| 6,359,863 B1 | 3/2002 | Varma et al. | |
| 6,411,997 B1 | 6/2002 | Dawes et al. | |
| 6,434,633 B1 | 8/2002 | Braun et al. | |
| 6,523,073 B1 | 2/2003 | Kammer et al. | |
| 6,553,446 B1 | 4/2003 | Miller | |
| 6,693,895 B1 | 2/2004 | Crummey et al. | |
| 6,735,642 B2 | 5/2004 | Kagan et al. | |
| 6,947,442 B1 | 9/2005 | Sato et al. | |
| 6,948,094 B2 | 9/2005 | Schultz et al. | |
| 6,990,594 B2 | 1/2006 | Kim et al. | |
| 7,100,020 B1 | 8/2006 | Brightman et al. | |
| 7,127,600 B2 | 10/2006 | Zimmer et al. | |
| 7,191,240 B1 | 3/2007 | Johnson | |
| 7,281,172 B2 | 10/2007 | Chujo | |
| 7,397,774 B1 | 7/2008 | Holland et al. | |
| 7,398,382 B2 | 7/2008 | Rothman et al. | |
| 7,506,084 B2 | 3/2009 | Moerti et al. | |
| 7,509,391 B1 | 3/2009 | Chauvel et al. | |
| 7,587,575 B2 | 9/2009 | Moertl et al. | |
| 7,590,817 B2 | 9/2009 | Moertl et al. | |
| 7,617,377 B2 | 11/2009 | Moertl et al. | |
| 7,681,012 B2 | 3/2010 | Verm et al. | |
| 7,685,476 B2 | 3/2010 | Andre et al. | |
| 7,802,256 B2 | 9/2010 | Havens et al. | |
| 7,853,731 B1 | 12/2010 | Zeng | |
| 7,899,941 B2 | 3/2011 | Hendry et al. | |
| 7,908,335 B1 | 3/2011 | Citterelle et al. | |
| 7,941,682 B2 | 5/2011 | Adams | |
| 7,996,574 B2 * | 8/2011 | Gupta | G06F 15/16 710/7 |
| 8,255,725 B2 | 8/2012 | Shimazaki et al. | |
| 8,352,624 B2 | 1/2013 | Zimmerman et al. | |
| 8,422,404 B2 | 4/2013 | Taki | |
| 8,468,285 B2 | 6/2013 | Kobayashi | |
| 8,555,099 B2 | 10/2013 | Marinkovic et al. | |
| 8,635,412 B1 | 1/2014 | Wilshire | |
| 8,656,228 B2 | 2/2014 | Check et al. | |
| 8,769,168 B2 | 7/2014 | Moertl et al. | |
| 8,788,822 B1 | 7/2014 | Riddle | |
| 8,799,537 B1 | 8/2014 | Zhu et al. | |
| 8,808,091 B2 | 8/2014 | Shaw et al. | |
| 8,819,386 B1 | 8/2014 | Mather | |
| 8,832,331 B2 | 9/2014 | Co | |
| 8,848,809 B2 | 9/2014 | Whitby-Strevens | |
| 8,914,649 B2 | 12/2014 | So et al. | |
| 9,152,580 B1 | 10/2015 | Chau et al. | |
| 9,170,957 B2 | 10/2015 | Touzni et al. | |
| 9,280,360 B2 | 3/2016 | Xu et al. | |
| 9,319,090 B2 | 4/2016 | Whitby-Strevens | |
| 9,544,069 B2 | 1/2017 | Whitby-Strevens et al. | |
| 9,547,535 B1 | 1/2017 | Wilt | |
| 9,568,970 B1 | 2/2017 | Kaushal et al. | |
| 9,582,448 B2 | 2/2017 | Saitou | |
| 9,594,718 B2 | 3/2017 | Kaushik et al. | |
| 9,769,756 B1 | 9/2017 | Cui et al. | |
| 9,801,044 B2 * | 10/2017 | Song | H04W 4/70 |
| 9,830,289 B2 | 11/2017 | Pulyala et al. | |
| 9,910,475 B2 | 3/2018 | Kurts et al. | |
| 9,913,305 B2 | 3/2018 | Pinheiro et al. | |
| 9,959,124 B1 | 5/2018 | Herbeck et al. | |
| 10,042,794 B2 * | 8/2018 | Sanghi | G06F 13/4027 |
| 10,078,361 B2 | 9/2018 | Sanghi et al. | |
| 10,362,107 B2 * | 7/2019 | Long | H04L 67/1095 |
| 2002/0013868 A1 | 1/2002 | West | |
| 2002/0044553 A1 | 4/2002 | Chakravorty | |
| 2002/0065867 A1 | 5/2002 | Chauvel | |
| 2002/0089994 A1 * | 7/2002 | Leach, Jr. | H04L 47/10 370/412 |
| 2002/0169938 A1 | 11/2002 | Scott et al. | |
| 2003/0014607 A1 | 1/2003 | Slavin et al. | |
| 2003/0086122 A1 | 5/2003 | Parry | |
| 2003/0200413 A1 | 10/2003 | Gurumoorthy et al. | |
| 2004/0044929 A1 | 3/2004 | Chujo | |
| 2004/0064589 A1 | 4/2004 | Boucher et al. | |
| 2004/0128568 A1 | 7/2004 | O'Shea | |
| 2004/0179546 A1 | 9/2004 | McDaniel et al. | |
| 2004/0201749 A1 | 10/2004 | Malloy | |
| 2004/0221056 A1 | 11/2004 | Kobayashi | |
| 2004/0228365 A1 | 11/2004 | Kobayashi | |
| 2005/0076196 A1 | 4/2005 | Zimmer et al. | |
| 2005/0108385 A1 | 5/2005 | Wechter et al. | |
| 2005/0114620 A1 | 5/2005 | Justen | |
| 2005/0117601 A1 | 6/2005 | Anderson et al. | |
| 2005/0149711 A1 | 7/2005 | Zimmer et al. | |
| 2005/0157781 A1 | 7/2005 | Ho et al. | |
| 2005/0285862 A1 | 12/2005 | Noda et al. | |
| 2006/0039285 A1 | 2/2006 | Chapman et al. | |
| 2006/0047989 A1 | 3/2006 | Delgado et al. | |
| 2006/0107071 A1 | 5/2006 | Girish et al. | |
| 2006/0218301 A1 | 9/2006 | O'Toole et al. | |
| 2007/0005869 A1 | 1/2007 | Balraj et al. | |
| 2007/0043901 A1 | 2/2007 | Wu et al. | |
| 2007/0070997 A1 | 3/2007 | Weitz et al. | |
| 2007/0180041 A1 | 8/2007 | Suzuoki | |
| 2007/0201492 A1 | 8/2007 | Kobayashi | |
| 2007/0226417 A1 | 9/2007 | Davis | |
| 2007/0286246 A1 | 12/2007 | Kobayashi et al. | |
| 2008/0010563 A1 | 1/2008 | Nishimura | |
| 2008/0046689 A1 | 2/2008 | Chen et al. | |
| 2008/0077816 A1 | 3/2008 | Ravichandran | |
| 2008/0183931 A1 | 7/2008 | Verm et al. | |
| 2008/0231711 A1 | 9/2008 | Glen et al. | |
| 2008/0235355 A1 | 9/2008 | Spanier et al. | |
| 2008/0244259 A1 | 10/2008 | Zimmer et al. | |
| 2008/0301148 A1 | 12/2008 | Lee et al. | |
| 2009/0024924 A1 | 1/2009 | Kim | |
| 2009/0113141 A1 | 4/2009 | Bullman et al. | |
| 2009/0138650 A1 | 5/2009 | Lin et al. | |
| 2009/0177847 A1 | 7/2009 | Ceze et al. | |
| 2009/0189442 A1 | 7/2009 | Chi | |
| 2009/0225818 A1 | 9/2009 | Dapper et al. | |
| 2009/0282050 A1 * | 11/2009 | Thomas | G06F 16/182 |
| 2009/0282088 A1 | 11/2009 | Thomas et al. | |
| 2010/0017655 A1 | 1/2010 | Gooding et al. | |
| 2010/0030932 A1 | 2/2010 | Ergas et al. | |
| 2010/0082859 A1 | 4/2010 | Hendry et al. | |
| 2010/0098419 A1 | 4/2010 | Levy et al. | |
| 2010/0329319 A1 | 12/2010 | Dai et al. | |
| 2011/0022859 A1 | 1/2011 | More et al. | |
| 2011/0029696 A1 | 2/2011 | Uehara | |
| 2011/0035575 A1 | 2/2011 | Kwon et al. | |
| 2011/0052142 A1 | 3/2011 | Sultenfuss et al. | |
| 2011/0083002 A1 | 4/2011 | Albers et al. | |
| 2011/0219208 A1 | 9/2011 | Asaad et al. | |
| 2011/0242425 A1 | 10/2011 | Zeng | |
| 2011/0248865 A1 | 10/2011 | Hong et al. | |
| 2011/0257983 A1 | 10/2011 | Rathonyi et al. | |
| 2011/0276710 A1 | 11/2011 | Mighani et al. | |
| 2011/0283031 A1 | 11/2011 | Lee | |

(56) References Cited

U.S. PATENT DOCUMENTS

| | | |
|---|---|---|
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0124252 A1 | 5/2012 | Kayama et al. |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0124895 A1 | 5/2013 | Saha et al. |
| 2013/0138840 A1 | 5/2013 | Kegel et al. |
| 2013/0162911 A1 | 6/2013 | Glen |
| 2013/0290947 A1 | 10/2013 | Li |
| 2014/0033220 A1 | 1/2014 | Campbell et al. |
| 2014/0052976 A1 | 2/2014 | Marino et al. |
| 2014/0101468 A1 | 4/2014 | Narayanan et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0189392 A1 | 7/2014 | Bodio et al. |
| 2014/0211894 A1 | 7/2014 | Yang et al. |
| 2014/0215236 A1 | 7/2014 | Heinrich et al. |
| 2014/0244866 A1 | 8/2014 | Manula et al. |
| 2014/0247983 A1 | 9/2014 | MacInnis et al. |
| 2015/0036051 A1 | 2/2015 | Broberg et al. |
| 2015/0189109 A1 | 7/2015 | Colin |
| 2015/0205749 A1 | 7/2015 | Whitby-Strevens et al. |
| 2015/0212806 A1 | 7/2015 | Hsieh |
| 2015/0271265 A1 | 9/2015 | Kobayashi et al. |
| 2015/0293873 A1 | 10/2015 | Shao et al. |
| 2015/0293875 A1 | 10/2015 | Sala et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0179157 A1 | 6/2016 | Ardanaz et al. |
| 2016/0224442 A1 | 8/2016 | Sanghi et al. |
| 2016/0269991 A1 | 9/2016 | Van et al. |
| 2016/0299860 A1 | 10/2016 | Harriman |
| 2016/0363955 A1 | 12/2016 | Stevens et al. |
| 2016/0364350 A1 | 12/2016 | Sanghi et al. |
| 2017/0026975 A1 | 1/2017 | Maric et al. |
| 2017/0108912 A1 | 4/2017 | Li et al. |
| 2017/0177222 A1 | 6/2017 | Singh et al. |
| 2017/0228481 A1 | 8/2017 | Pusuluri et al. |
| 2017/0249098 A1 | 8/2017 | Petkov et al. |
| 2017/0249164 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0042525 A1 | 2/2019 | McElrath et al. |
| 2019/0073011 A1 | 3/2019 | Paterson et al. |

FOREIGN PATENT DOCUMENTS

| | | |
|---|---|---|
| JP | 2012108677 A | 6/2012 |
| JP | 2013246642 A | 12/2013 |
| JP | 2015001867 A | 1/2015 |
| WO | WO-2008070138 A2 | 6/2008 |

OTHER PUBLICATIONS

Jackson, "PCI Express Technology", Sep. 2012 (Sep. 2012), MindShare Press, XP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

METHODS AND APPARATUS FOR SYNCHRONIZING UPLINK AND DOWNLINK TRANSACTIONS ON AN INTER-DEVICE COMMUNICATION LINK

PRIORITY AND RELATED APPLICATIONS

This application is a continuation of and claims the benefit of priority to commonly owned U.S. patent application Ser. No. 16/056,374 of the same title filed Aug. 6, 2018 issuing as U.S. Pat. No. 10,552,352 on Feb. 4, 2020, which is a divisional of and claims the benefit of priority to commonly owned U.S. patent application Ser. No. 15/011,291 of the same title filed Jan. 29, 2016 issued as U.S. Pat. No. 10,042,794 on Aug. 7, 2018, which claims the benefit of priority to commonly owned and U.S. Provisional Patent Application Ser. No. 62/175,174 filed Jun. 12, 2015 and entitled "METHODS AND APPARATUS FOR SYNCHRONIZING UPLINK AND DOWNLINK TRANSACTIONS ON AN INTER-PROCESSOR COMMUNICATION LINK", each of the foregoing being incorporated herein by reference in its entirety.

This application is also related to commonly owned and co-pending U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS"; U.S. patent application Ser. No. 14/879,027 filed Oct. 8, 2015 and entitled "METHODS AND APPARATUS FOR MANAGING POWER WITH AN INTER-PROCESSOR COMMUNICATION LINK BETWEEN INDEPENDENTLY OPERABLE PROCESSORS"; U.S. patent application Ser. No. 14/879,030 filed Oct. 8, 2015 and entitled "METHODS AND APPARATUS FOR RECOVERING ERRORS WITH AN INTER-PROCESSOR COMMUNICATION LINK BETWEEN INDEPENDENTLY OPERABLE PROCESSORS", each of which claim priority to U.S. Provisional Patent Application Ser. No. 62/061,605 filed Oct. 8, 2014 and entitled "METHODS AND APPARATUS FOR AN INTER-PROCESSOR COMMUNICATION LINK BETWEEN INDEPENDENTLY OPERABLE PROCESSORS", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The disclosure relates generally to the field of consumer electronics devices, as well as networks thereof. More particularly, in one exemplary aspect, the disclosure is directed to methods and apparatus for implementing a synchronized multi-directional transfer on an inter-device (e.g., inter-processor communication (IPC)) link between two (or more) independently operable devices such as processors. Various aspects of the present disclosure are directed to, inter alia, run-time processing, power management, and/or flow control of data transfers.

2. Description of Related Technology

Many electronic devices, such as e.g., mobile devices and portable computing devices, include integrated circuits (ICs) such as e.g., an Application Processor (AP) system on a chip (SoC), which is a main processor chip designed to support one or more applications running in the operating environment of the electronic device (e.g., host processor). The AP is in data communication with other peripheral chipsets (e.g., processors) of the device, such as e.g., cellular and/or Wi-Fi chipsets via a memory-mapped interconnect and/or bus.

Various bus architectures and techniques have evolved over time which enable handling of increasingly faster data rates and provide higher levels of data throughput for the AP and/or peripheral processors. One such example is Peripheral Component Interconnect Express (PCIe); see e.g., PCI Express Base Specification Revision 3.1 dated Oct. 8, 2014. PCIe is a high-speed serial computer expansion bus standard designed to replace older PCI and similar bus standards. In terms of architecture, PCIe is based on point-to-point connectivity with separate serial links connecting each endpoint peripheral component (e.g., graphics card, memory, Wi-Fi, cellular, etc.) to the root complex or host processor (including the AP).

Communication between the AP and the peripheral chipsets via PCIe has many desirable attributes in terms of, inter alia, performance and flexibility. However, PCIe (as well as some other existing "computer-centric" bus technologies) suffer certain disabilities, especially from the standpoint of portable consumer electronic device implementations. Specifically, as noted above, extant PCIe technologies were developed for use within desktop, server, and laptop computers, which are to varying degrees agnostic to many electrical power considerations affecting smaller portable devices. Desktops and servers (and to a lesser degree laptops) are less concerned with electrical power consumption/conservation, and more concerned with bus performance, ability to "hot plug", and the like. Accordingly, implementing a technology such as PCIe which, in its current incarnation, both (i) consumes significant electrical power during operation, and (ii) has limited power management infrastructure (e.g., application or host processor and chipset "sleep" states, and management of data and transactions during such sleep states), is generally unsuitable for portable consumer electronics applications where power consumption and battery conservation are critical (such as e.g., cellular- and Wi-Fi-enabled smartphones, tablets, "phablets", portable media players, etc.). Further, other device components, such as the AP and the peripheral chipsets each consume additional electrical power during operation.

In order to limit power consumption within the electronic device, both of the AP and the peripheral chipsets may be automatically and independently switched between one or more lower power states (e.g., an awake-low power state, a sleep-low power state, etc.) during periods of non-use and a higher power state (e.g., an awake-high power state) during periods of use. In some instances, activity or communication between the AP and the peripheral chipsets can initiate switching from a lower power state to a fully awake state (e.g., an awake-high power state). For example, activity or communication from the AP, such as e.g., an uplink request, can initiate switching of the peripheral chipset in a lower power state to a fully awake state and/or activity or communication from the peripheral chipset, such as e.g., a downlink request, can initiate switching of the AP in a lower power state to a fully awake state. Because existing PCIe operation does not consider power saving states during transactions, an untimely PCIe transaction may prevent a processor from entering a power saving state or cause an unnecessary exit from a power saving state.

Hence, there is a need for improved apparatus and associated methods which can leverage the high data throughput and other desirable attributes of bus technologies such as PCIe (and other "memory mapped" technologies), yet support the requirements of rigorous power management and conservation.

SUMMARY

The present disclosure satisfies the foregoing needs by providing, inter alia, methods and apparatus for implementing a synchronized multi-directional transfer on an inter-processor communication (IPC) link between two (or more) independently operable processors.

In a first aspect, apparatus configured to perform a synchronized multi-directional transfer is disclosed. In one embodiment, the apparatus includes a first and a second device coupled via a physical bus interface; a first memory associated with the first device; and a second memory associated with the second device. The synchronized multi-directional transfer is configured to cause the second device to: bring the physical bus interface out of a sleep state; push a first accumulated amount of data out of the second memory; and pull a second accumulated amount of data out of the first memory. The pushing and pulling of accumulated data occurs substantially contemporaneously.

In one variant, the first device is configured to cause the second device to perform the synchronized multi-directional transfer responsive to an event.

In yet another variant, the second accumulated amount of data is associated with an array of queued transfer descriptors.

In yet another variant, the first device initiates a timer to initiate an interrupt in the event that the second device does not process the array of queued transfer descriptors within a given period of time.

In yet another variant, the initiated timer is reset upon receipt of an interrupt from the second device.

In yet another variant, the interrupt occurs when the second device fails to recognize the event.

In yet another variant, the first device receives an interrupt from the second device upon completion of processing of the synchronized multi-directional transfer.

In yet another variant, the first device is expected to process the first accumulated amount of data more quickly than the second device can process the second accumulated amount of data.

In a second aspect, a method performed by a first device in order to synchronize multi-directional transfers between the first device and a second device over a physical bus interface is disclosed. In one embodiment, the method includes queuing a plurality of data in a memory associated with the first device; initiating a timer specifying a time limit for transfer of the plurality of data to the second device; and receiving an interrupt from the second device, the interrupt indicative of successful processing of the plurality of data by the second device.

In a variant, the act of queuing the plurality of data comprises: allocating a first portion of the plurality of data to a first frame synchronization period; and allocating a second portion of the plurality of data to a second frame synchronization period.

In another variant, the method further includes resetting the timer upon receipt of an interrupt from the second device.

In yet another variant, the method further includes ringing an interrupt upon expiration of the timer.

In yet another variant, the method further includes updating a head pointer doorbell array to point to a beginning of the plurality of data.

In yet another variant, the method further includes transferring the plurality of data to the second device.

In yet another variant, the method further includes receiving a second plurality of data from the second device, the act of transferring the plurality of data to the second device and the act of receiving a second plurality of data from the second device occurs substantially contemporaneously.

In a second embodiment, the method includes receiving a synchronization frame from the second device; initiating a data transfer between the first device and the second device upon receipt of the synchronization frame; and generating an interrupt for transfer to the second device upon completion of the data transfer to the first device.

In a variant, the method further includes programming a direct memory access (DMA) for a downlink data transfer based on a plurality of received transfer descriptors.

In another variant, the method further includes updating a tail pointer array for the DMA upon completion of the data transfer to the first device.

In yet another variant, the method further includes transmitting the interrupt from the first device to the second device.

In yet another variant, the interrupt indicates successful completion of processing of both uplink and downlink data.

In a third aspect, a host processor is disclosed. In one embodiment, the host processor includes an applications processor. In one variant, the applications processor is enabled so as to synchronize multi-directional transfers between itself and one or more other devices over a physical bus interface.

In another variant, the one or more other devices include one or more baseband processors.

In a fourth aspect, an endpoint processor is disclosed. In one embodiment, the endpoint processor includes a baseband processor. In one variant, the baseband processor is enabled so as to synchronize multi-directional transfers between itself and one or more other devices over a physical bus interface.

In another variant, the one or more other devices include one or more applications processors.

In a fifth aspect, physical bus architecture is disclosed. In one embodiment, the physical bus architecture includes an inter-processor communication (IPC) link. In a variant, the IPC link is configured so as to enable synchronized multi-directional transfers between one or more applications processors and one or more baseband processors.

In a sixth aspect, an exemplary data structure is disclosed. In one embodiment, the exemplary data structure enables synchronized multi-directional transfers between two or more devices.

In a variant, the exemplary data structure includes a first pipe in the uplink direction from a host device to a peripheral device and a second pipe in the downlink direction from the peripheral device to the host device.

In another variant, the exemplary data structure includes a tail pointer array, a head pointer doorbell array and a doorbell register.

In a seventh aspect, scatter-gather input/output (I/O) transfer methodologies and associated apparatus are disclosed.

In an eighth aspect, methodology that enables an endpoint processor to handle accumulated data is disclosed. In one embodiment, the methodology includes programming a direct memory access (DMA) for one or more descriptors; generating an interrupt; continuing the transfer of descriptors if they are available; polling for additional descriptors; and when the additional descriptors are available, resuming the transfer.

In a ninth aspect, non-transitory computer readable media are disclosed. In one embodiment, the non-transitory computer readable media enables synchronized multi-directional transfers between two or more devices.

Other features and advantages of the present disclosure will immediately be recognized by persons of ordinary skill in the art with reference to the attached drawings and detailed description of exemplary embodiments as given below.

Figure 1:
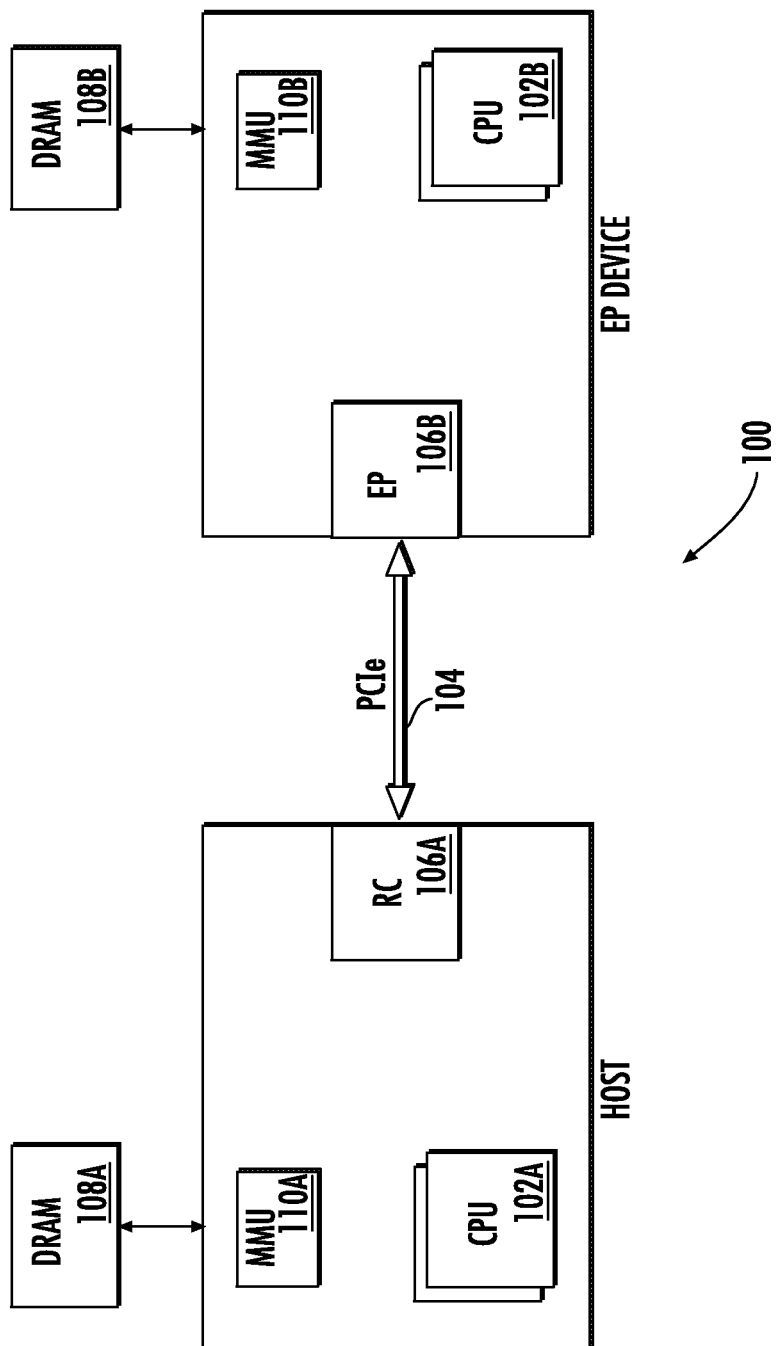
FIG. 1 is a logical block diagram of one exemplary apparatus useful for illustrating various principles described herein.

All Figures© Copyright 2015 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link, and the aforementioned IPC link is discussed in the context of the Peripheral Component Interconnect Express (PCIe) standard (e.g., as is described in "PCI Express Base Specification Revision 3.1" published Oct. 8, 2014), it will be recognized by those of ordinary skill that the present disclosure is not so limited. In fact, the various aspects of the disclosure are useful in any device or network of devices that are configured to incorporate and coordinate multiple independent devices (e.g., processing elements), including e.g., in an inter-platform fashion (e.g., across two or more discrete host devices) as is disclosed herein. Moreover, it will be appreciated that the various features and techniques described herein can be applied to and implemented using other bus protocols, including especially those based on memory-mapped schemes.

While the following embodiments describe specific implementations of e.g., synchronization frames, transfer speeds, amounts of data transferred, etc., those of ordinary skill in the related arts will readily appreciate that such descriptions are purely illustrative of the broader principles described herein.

Exemplary Inter-Processor Communications Link

Bus techniques have evolved which are able to handle faster data rates and provide higher levels of data throughput. One such example is Peripheral Component Interconnect Express (PCIe). PCIe has historically been used as a high-speed serial computer expansion bus technology; PCIe is based on point-to-point connectivity with separate serial links connecting every endpoint component (e.g., graphics card, memory, Wi-Fi, cellular, etc.) to the root complex (e.g., host processor). However, existing PCIe technologies are not optimized for most portable consumer electronics applications. For example, portable consumer electronics may have power saving states which reduce power consumption (e.g., low power modes, sleep modes, etc.) Since existing PCIe operation does not consider power saving states during transactions, an untimely PCIe transaction may prevent a processor from entering a power saving state or cause an unnecessary exit from a power saving state.

Within this context, methods and apparatus are now described which implement a synchronized multi-directional transfer on an inter-processor communication (IPC) link between two (or more) independently operable processors. As described in greater detail hereinafter, the synchronized multi-directional transfer: (i) allows a link to remain in a low power state for a longer amount of time; (ii) reduces transitions into and out of low power state(s); and (iii) reduces processor interrupts (for both host and endpoints) thereby preventing undesirable context switches.

The following discussions are described in reference to a "host" processor (e.g., an Applications Processor (AP)) and an "endpoint" or peripheral processor (e.g., a Baseband Processor (BB)). However, for reasons which will become apparent below, it is appreciated that the designation as to host or peripheral processor is used to simplify and/or clarify the following explanations, and does not imply existing host or peripheral functionality. Moreover, those of ordinary skill in the related arts will readily appreciate that the various principles described herein, may broadly apply to any network of two (or more) independently operable processors.

The following discussions are described with respect to a bi-directional link between two independently operable processors, having an uplink (from the AP to the BB) and a downlink (from the BB to the AP) direction. Additionally, the following discussions are presented within the context of a bi-directional radio link between a mobile device and a wireless base station, having a radio uplink (from the mobile device to the base station) and a radio downlink (from the base station to the mobile device) direction. Those of ordinary skill in the related arts will readily appreciate that the various principles described herein may be readily adapted for use in other multi-directional links and/or network topologies. For example, so called "bus" networks and "mesh" networks incorporate shared interfaces which may allow for multiple points of ingress/egress.

In one aspect, a synchronized multi-directional transfer on an inter-processor communication (IPC) link utilizes one or more buffers which are configured to accumulate data during a first state. The one or more buffers are further configured to transfer the accumulated data during a second state. In one exemplary embodiment, the accumulated data occurs during a low power state where one or more processors are inactive, and the data transfer occurs during an operational state where the one or more processors are active (typically two processors are active). In one exemplary implementation, any one of the independently operable processors may be active, even when one or more of the remaining independently operable processors are asleep, powered down, powered off, etc.

Under certain network conditions, one or more buffers of the IPC link may accumulate more data than can be transferred within the currently available transfer resources (e.g., available transfer descriptors (TDs), time slots, etc.) The data transfer is performed in accordance with the currently available transfer resources, and halted until additional transfer resources are made available. Once additional transfer resources are available, the data transfer is resumed. The halt and resume process is repeated until the entire buffer is exhausted.

In some implementations, one or more of the independently operable processors may execute traffic monitoring processes so as to optimize data throughput of the IPC link. Unfortunately, since the contents of the buffers may not be visible to the traffic monitoring processes, disclosed variants provide flow control signaling to assist in such traffic monitoring processes. For example, one or more processors may incorporate a queue mechanism for processing data, where: (i) when the amount of queued data has exceeded an upper threshold, the processor enables flow control, and (ii) when the amount of queued data has dropped below a lower threshold, the processor disables flow control. Flow control halts additional data transfers, so as to allow the queued data to be processed in a timely manner (i.e., flow control prevents data overflow conditions).

As used herein, the term "logical" or "virtual" are interchangeably used to refer to an abstraction (typically performed in software or machine logic) to represent physical mechanisms, attributes or functionalities as a data structure. For example, as used herein a "logical bus interface", "virtual bus interface", etc., refers generally to an abstraction or representation of a bus interface as a series of data structures. In contrast, as used herein a "physical bus interface" refers to the physical mechanisms, attributes, or functionalities of a physically tangible bus interface.

As used herein, the term "in-band" refers to data transactions which are transacted within a logical or physical interface, and which affect the mechanisms, attributes, or functionalities of the logical or physical interface. In contrast, the term "out-of-band" refers to data transactions which are not transacted within a logical or physical interface, and which affect the mechanisms, attributes or functionalities of the logical or physical interface.

FIG. 1 is a logical block diagram of one exemplary apparatus 100 (e.g., an electronic device) useful for illustrating various principles described herein. As shown, the apparatus 100 includes a first and second processor (102A, 102B), and a physical bus interface 104 that is configured to implement an inter-processor communication (IPC) link between two (or more) independently operable processors.

In the illustrated implementation, the first processor 102A includes an applications processor (AP). As shown in FIG. 1, the first processor 102A is coupled to a Root Complex (RC) 106A which functions as the host of the IPC bus. The second processor 102B includes a baseband processor (BB) which includes a wireless modem that is configured to communicate with a base station via a radio link (not shown). In other embodiments, the second processor 102B may be e.g., a media processor, or other network processing element. As shown in FIG. 1, the second processor 102B is coupled to an Endpoint (EP) 106B which functions as the peripheral of the IPC bus. In one exemplary embodiment, the physical bus interface 104 is a so-called "Generation 1" link that is capable of a theoretical maximum of 2 Gbps (gigabits-per-second) data transfer rate and the exemplary wireless modem 102B is a so-called "Category 9" (CAT 9) device in radio communication with a cellular base station (not shown). CAT 9 radio links are expected to support 450 Mbps (megabits-per-second) in the radio downlink (i.e., data received from the base station) and 100 Mbps radio uplink (i.e., data transmitted to the base station).

As shown, both the first and the second processors (102A, 102B) are each coupled to a non-transitory computer readable medium (e.g., dynamic random access memory (DRAM)) (108A, 108B) and a memory management unit (MMU) (110A, 110B). The non-transitory computer readable medium is configured to store computer readable instructions (e.g., in the form of one or more computer programs) for execution by their respective processors.

Figure 2:
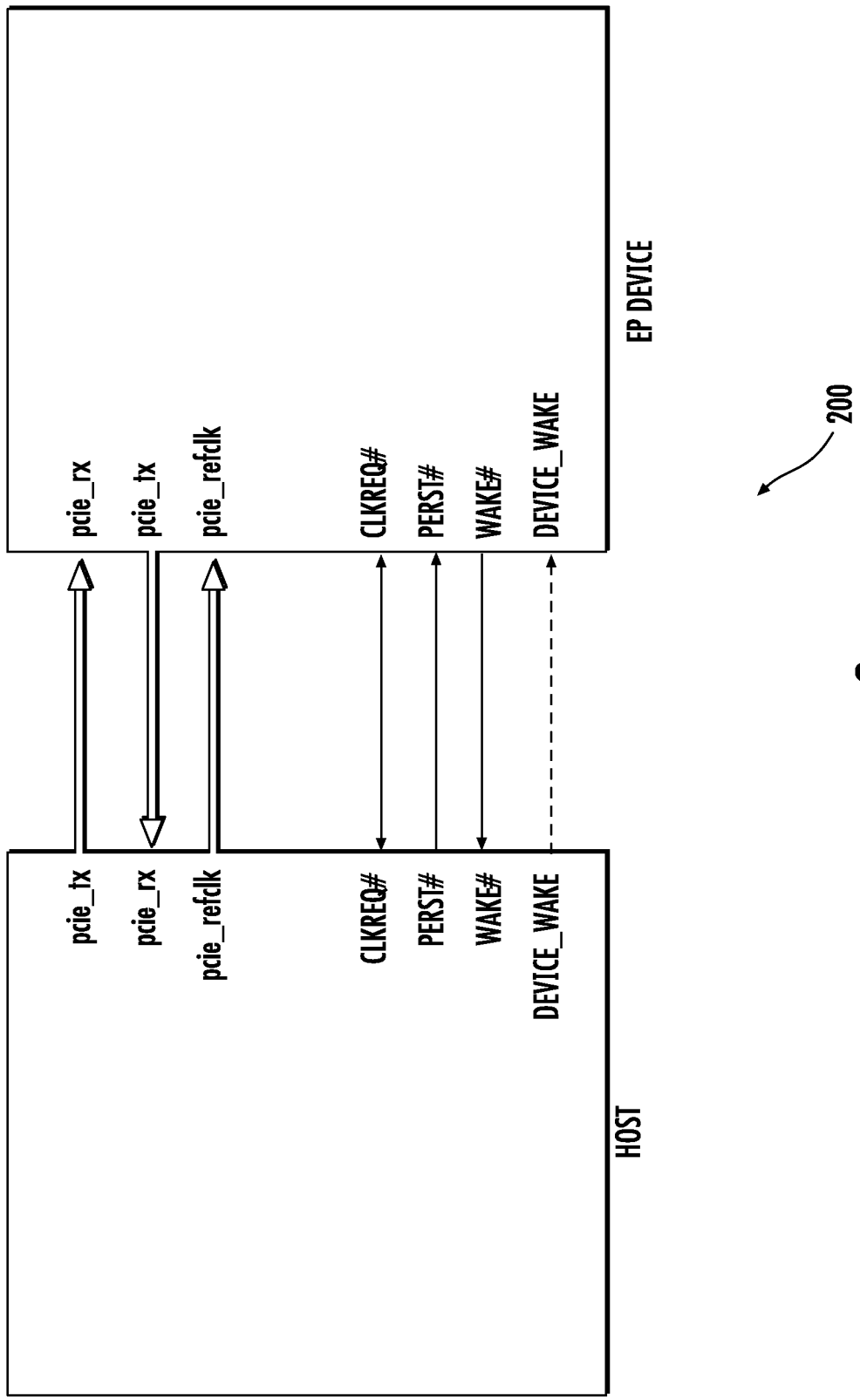
FIG. 2 is a logical block diagram of one exemplary physical bus interface useful in conjunction with the various principles described herein.

As shown in FIG. 2, the physical bus interface 104 is loosely based on the Peripheral Component Interconnect Express (PCIe) standard (e.g., as is described in "PCI Express Base Specification Revision 3.1" published Oct. 8, 2014, and incorporated by reference herein in its entirety). Those of ordinary skill in the related arts, given the contents of the present disclosure, will readily appreciate that other bus interface standards may be substituted with equal success. Various modifications to the underlying physical bus interface 104 (and protocols used therewith) to support a synchronized multi-directional transfer on an inter-processor communication (IPC) link between two (or more) independently operable processors are described in greater detail hereinafter.

In the exemplary embodiment, the physical bus interface 104 is a point-to-point communication channel between two IPC ports (the RC and EP) allowing both to send/receive access requests (configuration read/write, I/O read/write, memory read/write) and interrupts. At the physical level, a link is composed of one or more lanes (one lane 200 is shown in FIG. 2), each lane having receive and transmit component (pcie_rx, pci_tx). Each lane is a full-duplex byte stream, transporting data packets in eight-bit 'byte' formats, between the RC and EP of a link, in both directions simultaneously. The physical IPC link 104 can support multiple logical links (or virtual bus interfaces) representing multiple ongoing data sessions.

In one such variant, each virtual bus interface further includes one or more "sessions" which are a persistent and/or semi-persistent set of data transactions (e.g., datagrams) between two logical endpoints. In some implementations, the session may include "stateful" transactions (i.e., the data transactions are based on a current state of the session), and/or "stateless" transactions (i.e., the data transactions are not based on a current state of the session).

In one exemplary embodiment, a client service (e.g., control, data, trace, etc. associated with a data session) is associated with a single interface, i.e., a pair of pipes. Each client service input/output (I/O) may be composed of multiple so-called "transfer descriptors" (TD). For example, a single TD may describe a physically contiguous memory buffer, accessible by the host/peripheral processor over the communication link.

Each pipe (i.e., data stream) is associated with one "transfer descriptor ring" (TDR). The TDR data structure resides in host processor memory and is accessible by the peripheral processor. Each TDR is described by a head pointer and a tail pointer, and encompasses one or more TD; each TD includes: an address of a buffer in host memory, a size of the buffer, a next count that indicates the number of TDs remaining in an I/O transfer, and a completion status. The head pointer points to the next empty slot in the TDR, whereas the tail pointer points to the address of next TD which the peripheral will process. The head pointer is written by the host and read by the peripheral. The tail pointer is read by the host and written by the peripheral. All TDs and associated data buffers between the tail pointer and the head pointer are associated with the peripheral processor. When the head pointer is equal to the tail pointer, the TDR is empty.

The second processor 102B (e.g., the BB/peripheral processor) provides a so-called "doorbell" register. The first processor 102A (e.g., the AP/host processor) provides a so-called "head pointer doorbell array" (HPDA) which is indexed by pipe number. The host processor notifies the peripheral processor of a new TD in a TDR by writing the head pointer value in the doorbell register of a pipe number offset inside the HPDA. The doorbell register causes an interrupt for the BB, which causes the BB to check for changes in the HPDA. Similarly, the host provides a so-called "tail pointer array" (TPA) in host memory that is indexed by pipe number, which is updated by the peripheral processors with tail pointer values to indicate completion of a TD.

In one exemplary aspect of the present disclosure, the first processor 102A configures one or more TDs for a synchronized multi-directional transfer on the physical bus interface 104. The second processor 102B is configured to (at every synchronization frame or doorbell interrupt event) perform the synchronized multi-directional transfer on the physical bus interface 104, in accordance with one or more TDs. The baseband processor accumulates downlink data via its radio link, and the application processor accumulates uplink data via interactions with the user and/or applications software. In one variant, because the baseband processor is unaware of uplink data status until it services the uplink TD pipe at the synchronization frame (and vice versa), the baseband processor controls the physical bus interface (PCIe IPC link), and may enable or disable the physical bus interface based on application processor request (via doorbell registers) or via radio link status (e.g., based on synchronization frame interval information, etc.)

Referring back to the exemplary embodiment, the first and the second processors (102A, 102B) and physical bus interface 104 operate according to a power management state machine. In one implementation, the state machine is loosely based on the Link Training and Status State Machine (LTSSM) as described in the PCIe standard, incorporated supra.

Figure 3:
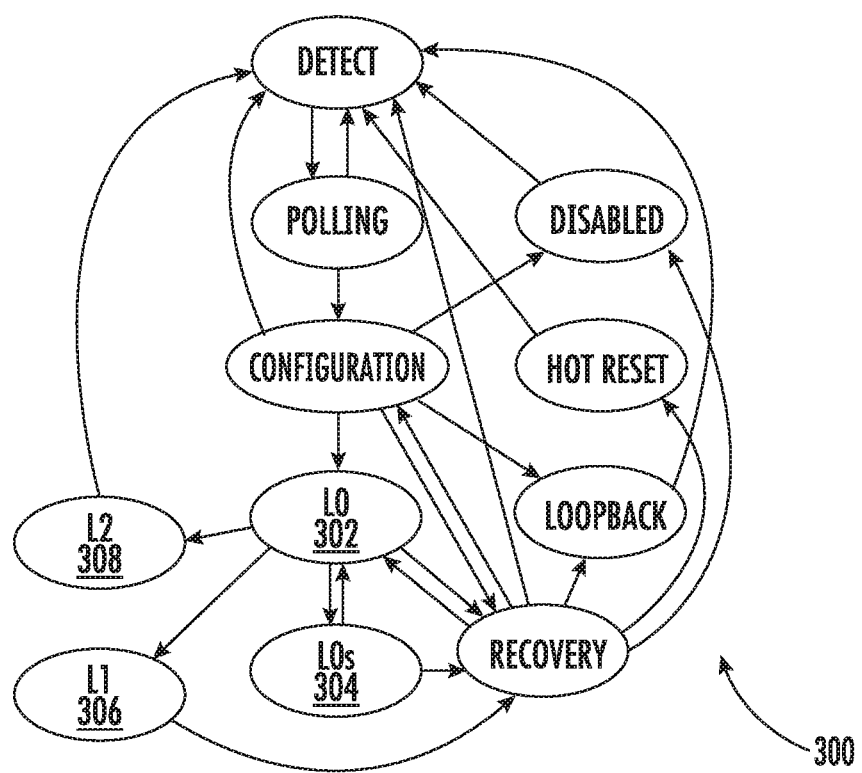
FIG. 3 is a logical representation of one exemplary Link Training and Status State Machine (LTSSM), useful in conjunction with various described embodiments.

FIG. 3 illustrates one exemplary Link Training and Status State Machine (LTSSM) 300 which includes, inter alia, states L0 302, L0s 304, L1 306, and L2 308. L0 302 is the operational state of the physical bus interface 104 where data and control packets can be transmitted and received. L0s 304 is a first power saving state that allows the physical bus interface 104 to quickly enter and recover from a power conservation state without going through the Recovery state. L1 306 is a second power saving state that allows additional power savings over L0s 304 at the cost of additional resume latency (due to the Recovery state). L2 308 is a third power saving state that aggressively conserves power by turning off most functionality.

Figure 4:
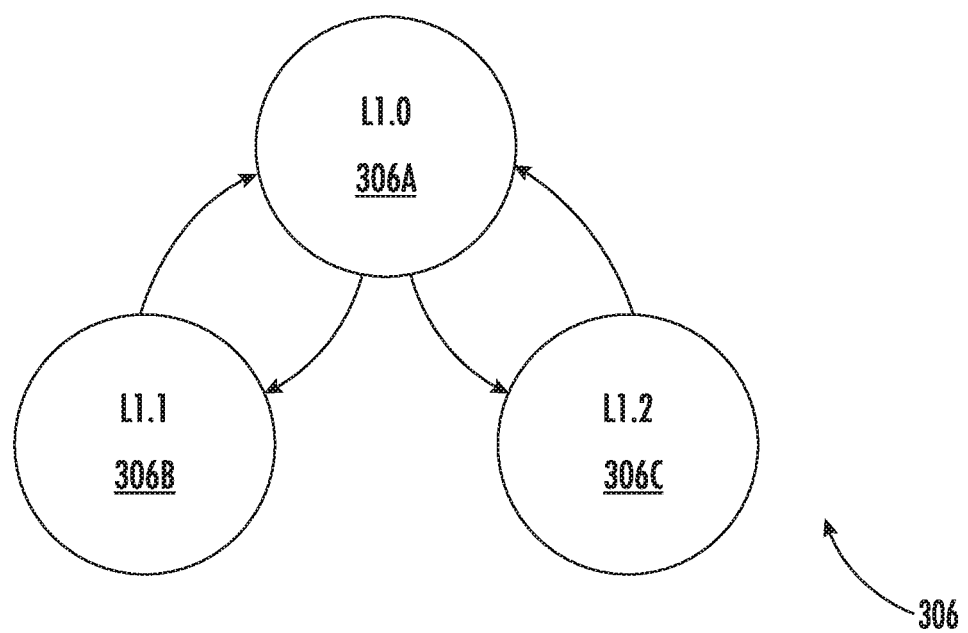
FIG. 4 is a logical representation of a modified state of the exemplary Link Training and Status State Machine (LTSSM) described in FIG. 3, useful in conjunction with various described embodiments.

FIG. 4 illustrates modifications to the L1 state 306 of FIG. 3, which are described in the aforementioned PCIe specification, see supra. As described therein, L1 306 is further subdivided into L1 Power Management (PM) substates: L1.0 306A, L1.1 306B, and L1.2 306C. The entry conditions and operation of L1.0 306A generally corresponds to the conventional L1 306 state of the PCIe standard, with the exception that L1.0 306A further enables transitions to L1.1 306B, and L1.2 306C, based on bidirectional open-drain clock request (CLKREQ #) signaling.

The L1.1 306B substate supports the common mode voltages of the physical bus interface 104, whereas the L1.2 306C substate does not support the common mode voltages. Unlike L1.0 306A, both L1.1 306B and L1.2 306C can further disable the upstream and downstream ports of the physical bus interface 104, further improving power consumption.

Those of ordinary skill in the related arts, given the contents of the present disclosure, will readily appreciate that the foregoing exemplary LTSSM 300 and L1 PM substates described in FIGS. 3 and 4 are purely illustrative, and other power management state machines may be substituted with equal success.

Exemplary Uplink and Downlink Synchronization Scheme—

In accordance with one aspect of the present disclosure, the exemplary physical bus interface 104 performs uplink and downlink data transfer at synchronized time intervals. Specifically, at predetermined time intervals or "synchronization frames" (e.g., N milliseconds), the BB 102B brings the physical bus interface 104 out of a sleep state (e.g., the aforementioned L1.2 306C PM substate) and pushes accumulated data out of the BB downlink buffers to the AP memory while simultaneously pulling the accumulated uplink data from the AP memory into the BB memory. In this manner, the IPC link is active only during these synchronization frame intervals, and is allowed to remain in the reduced power states (e.g., L1.2 306C PM substate) for a maximum amount of time (thereby reducing overall power consumption). Additionally, by performing uplink and downlink at the same time (as opposed to on an as-requested basis), the IPC link minimizes transitions from a high power state (e.g., L0 302) to a reduced power state (e.g., L1.2 306C (via the L1.0 306A substate)), and vice versa. Finally, the synchronized data transfer reduces the doorbell interrupts seen by the BB 102B, and the message signaled interrupts (MSI) seen by the AP 102A. More directly, the doorbell interrupts/MSI can be limited to unscheduled transactions (e.g., overflow conditions, error conditions, etc.)

In one such embodiment, the synchronization frame occurs at four (4) millisecond (ms) time intervals. As previously noted, the exemplary BB 102B operates at CAT 9 rates and can buffer up to 225 KBs (kilobytes) of radio downlink data (within the BB memory) and 50 KBs of data for radio uplink transmissions (within the AP memory) during one synchronization frame. The Generation 1 IPC link can transfer the downlink data to the AP in 0.84 ms, and the uplink data to the BB in 0.18 ms. The IPC link can then switch to a reduced power state until the next synchronization frame, thereby greatly reducing power consumption.

In one exemplary embodiment, the IPC link transfer queues associated with the uplink and downlink data are sized so as to sustain maximum data throughput within the synchronization frame without affecting data latency. Specifically, the uplink data (which is intended to be transmitted to the base station), can minimize data latency by ensuring that the uplink data is always transmitted at the first available synchronization frame. In one embodiment, the AP queues for receiving the downlink data (which has been queued by the BB in a previous radio frame) is at least two times the maximum amount of data that the BB can accumulate during a synchronization frame (e.g., 450 KBs). In one such variant, the AP queues for receiving downlink data operate according to a so-called "ping-pong" buffer scheme where a first half of the queue is filled during a first frame synchronization, and a second half of the queue is filled during the second frame synchronization. During the second frame synchronization, the AP can process the first half of the queue without interfering with the filling of the second half. Subsequent intervals alternate filling and processing of the halves of the queue. More generally, other schemes for buffer management (e.g., such that data reads and writes can simultaneously occur at different portions of a memory buffer) may be substituted with equal success. Common examples of such schemes include e.g., ring buffers, double/triple buffers, etc.

Figure 5:
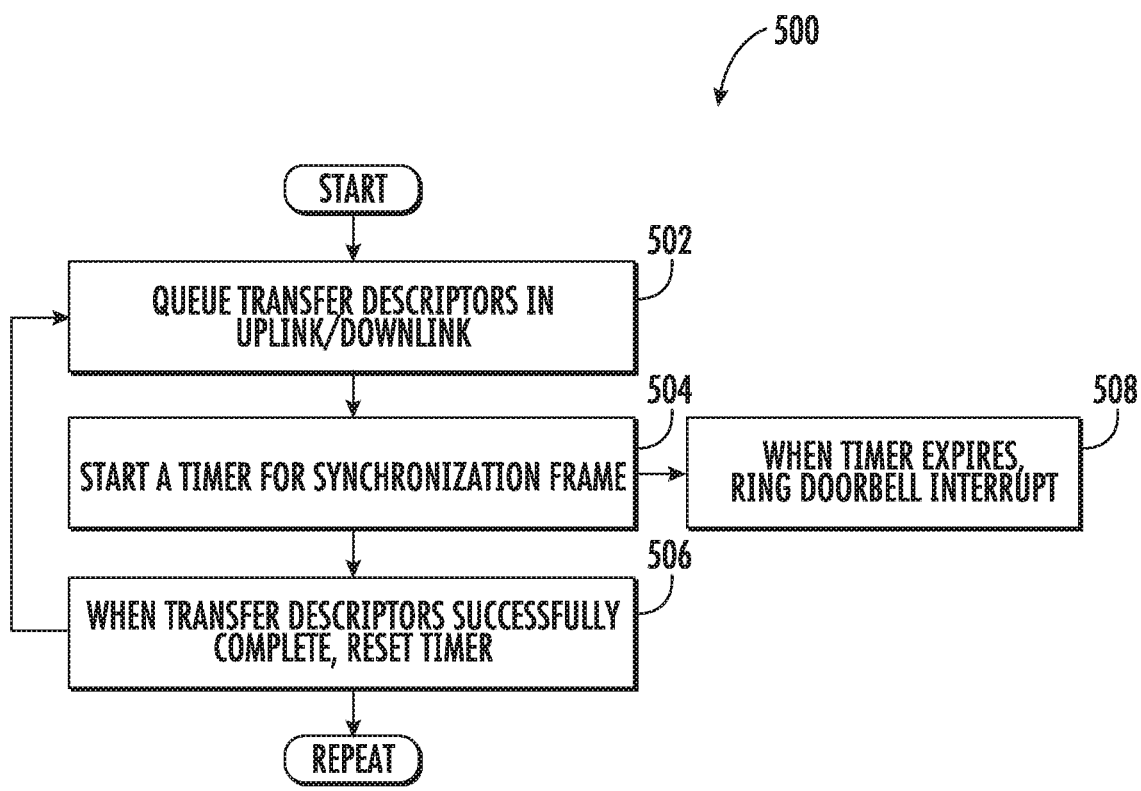
FIG. 5 is a logical flow diagram of an exemplary application processor (AP) portion of one exemplary method for implementing a synchronized multi-directional transfer, in accordance with the present disclosure.

FIG. 5 is a logical flow diagram of the application processor's portion of one exemplary method for implementing a synchronized multi-directional transfer.

At step 502 of the method 500, the application processor PCIe IPC driver queues IPC link input/output (I/O) transfers in one or both uplink and downlink directions by generating a transfer descriptor (TD) entry within an array of queued TDs, and updating a head pointer doorbell array to point to the beginning of the array.

At step 504 of the method 500, the application processor starts a timer to ring a "doorbell interrupt" in the event that the baseband processor does not process the array of TDs (step 508) at the appropriate time. The timer is larger than the synchronization frame used by the baseband, thereby ensuring that the timer will not expire unless the baseband has missed the synchronization frame.

When the application processor receives a message signaled interrupt (MSI) indicating that the baseband has completed processing the array of queued TDs (i.e., the direct memory access (DMA) associated with the TD has completed successfully), the application processor resets the timer (step 506).

The application processor is expected to process data faster than the baseband processor (which is limited by the radio uplink/downlink). When the application processor has completed processing its data, it repeats the method 500; e.g., it replenishes the TD entries, etc. In some variants, the application processor and/or baseband processor may implement error conditions in the event that the application processor is stalled, or otherwise unable to replenish the TD entries in time for the next synchronization frame.

Figure 6:
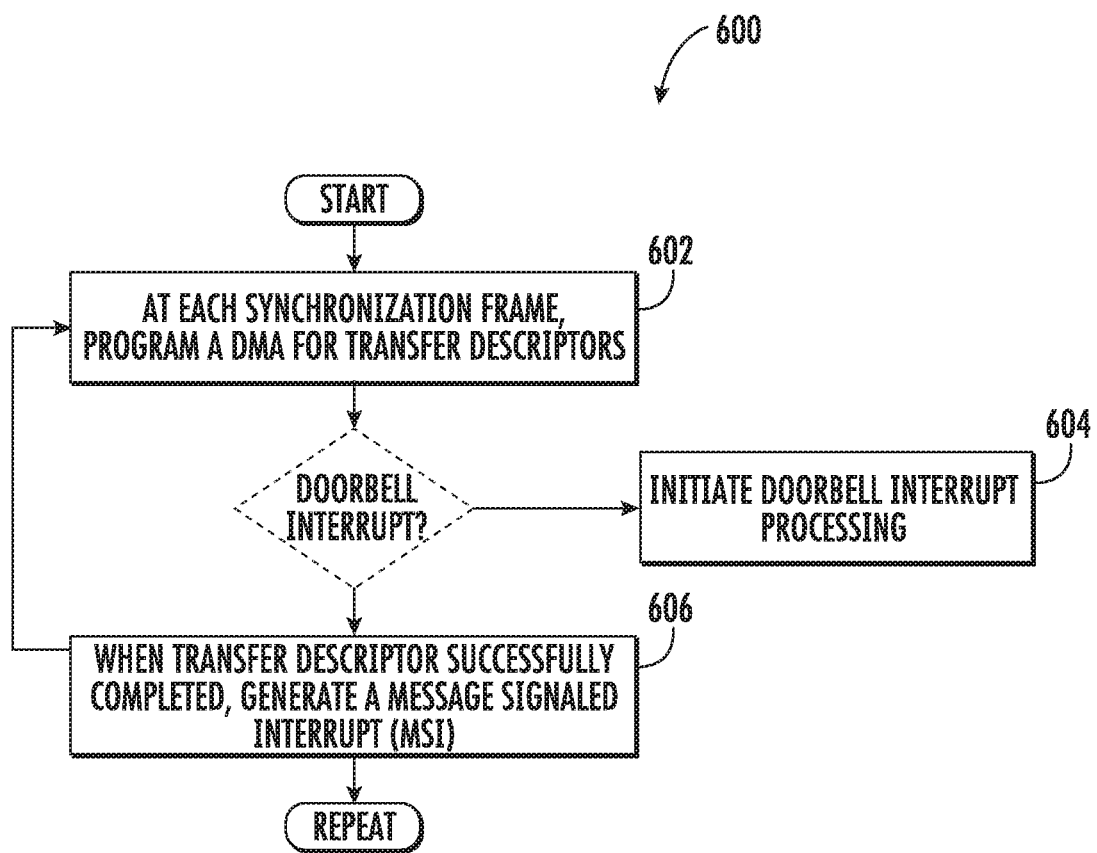
FIG. 6 is a logical flow diagram of an exemplary baseband processor (BB) portion of one exemplary method for implementing a synchronized multi-directional transfer, in accordance with the present disclosure.

FIG. 6 is a logical flow diagram of the baseband processor's portion of one exemplary method for implementing a synchronized multi-directional transfer. In one exemplary embodiment, the baseband processor uses the Long Term Evolution (LTE) Transmission Time Interval (TTI) timer as a synchronization timer source. The TTI timer fires every one (1) millisecond (ms). After four (4) instances of the TTI timer firing, the software data driver on the baseband processor sends any buffered downlink data to the baseband PCIe IPC driver. In one exemplary embodiment, the AP continuously processes and replenishes TDs, thus the baseband's PCIe IPC driver will have queued TDs to DMA at every synchronization frame. In this manner, the baseband can sustain peak throughput on the DMAs, while minimizing the requirement to bring the link out of low power.

At step 602 of the method 600, at each synchronization frame interval, the baseband processor programs a DMA for downlink data transfer based on the TDs. When the baseband processor completes the applicable TDs, it updates the tail pointer array.

In some circumstances, normal processing may proceed automatically at each synchronization frame interval. However, on occasion the application processor may be required to interrupt the normal processing with a doorbell interrupt. Thus, responsive to receiving a doorbell interrupt (step 604 of the method 600), the baseband processor initiates doorbell interrupt processing.

Figure 6A:
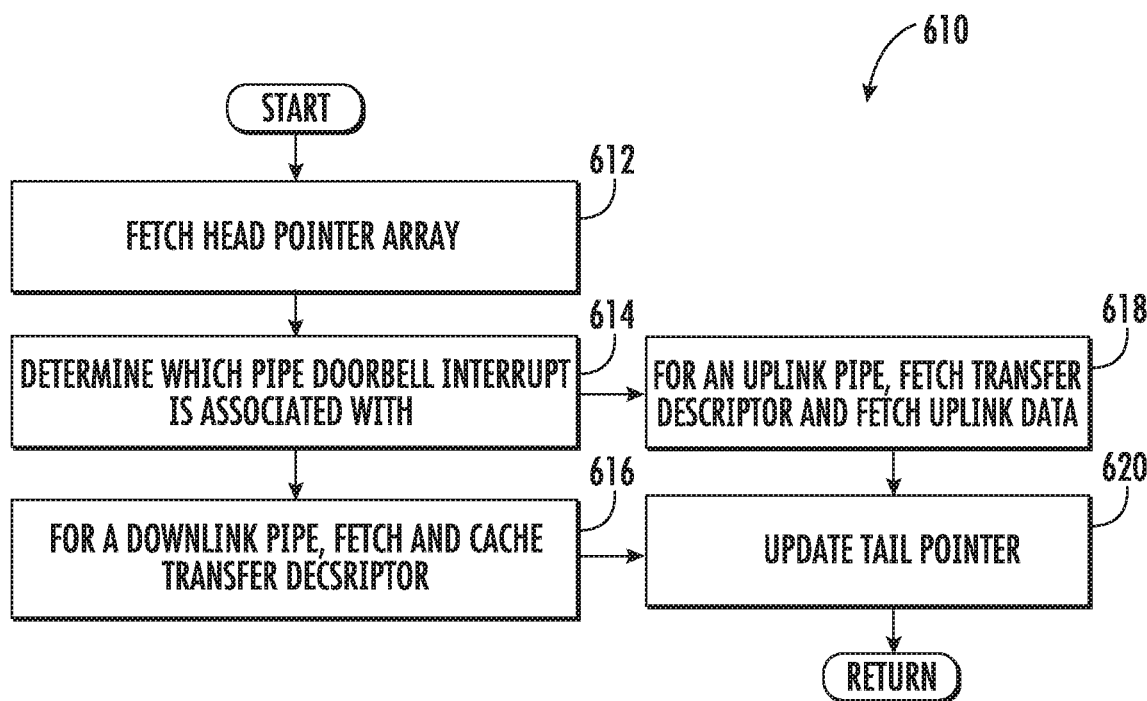
FIG. 6A is a logical flow diagram of doorbell interrupt processing, useful in conjunction with the exemplary method of the exemplary baseband processor of FIG. 6, in accordance with the present disclosure.

As a brief aside, FIG. 6A illustrates one exemplary doorbell interrupt processing scheme 610. At step 612 of the method 610, the baseband processor fetches the HPDA from the applications processor memory.

At step 614 of the method 610, the baseband processor determines which pipe the doorbell interrupt is associated with. For a head pointer that updates a downlink pipe, the baseband processor fetches and caches the TDs (step 616 of the method 610). For head pointer updates of an uplink pipe, the baseband processor fetches the TDs, and then fetches the data in the applications processor buffers (step 618 of the method 610).

Once the baseband processor has completed processing the TDs, the baseband processor updates the tail pointer (step 620 of the method 610), and returns to the normal processing scheme of FIG. 6.

Referring back to FIG. 6, at step 606 of the method 600, when the baseband processor has completed processing each TD, the baseband processor generates a message signaled interrupt (MSI) to indicate completion to the application processor. In one embodiment, the baseband must generate only a single MSI to indicate completion of both uplink and downlink TDs. In other variants, the baseband may generate MSIs to signify completion of specific pipes, etc.

Figure 7:
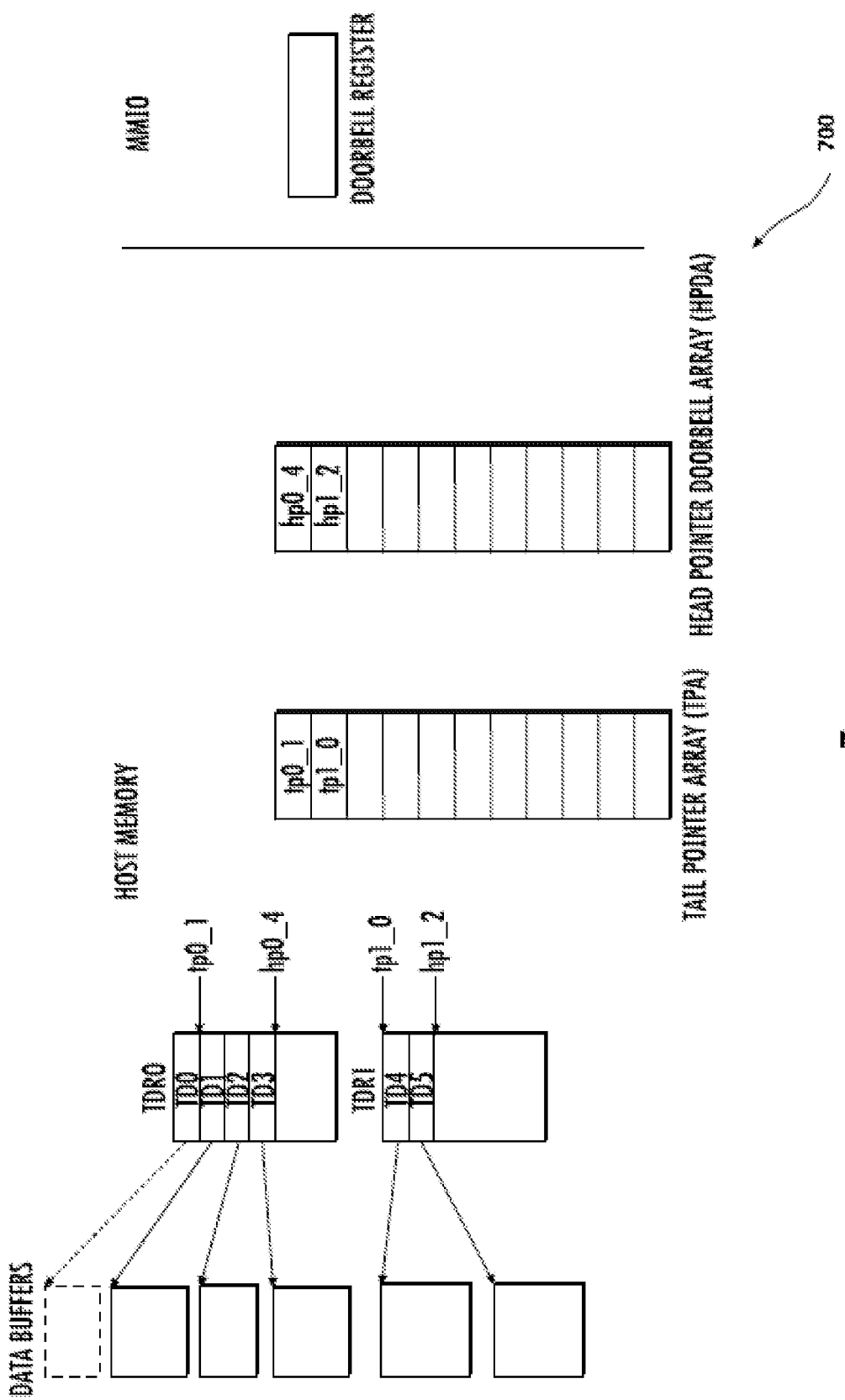
FIG. 7 is a logical representation of one exemplary dual pipe data structure comprising two (2) transfer descriptor ring (TDR) data structures each of which comprises a number of transfer descriptors (TDs), useful in conjunction with the various described embodiments.

FIG. 7 illustrates one exemplary data structure 700 useful in conjunction with the methods described supra. The data structure 700 includes a first pipe (TDR0) in the uplink direction (from the host to the peripheral), and a second pipe (TDR1) in the downlink direction (from the peripheral to the host). As shown, the host processor has queued four (4) TDs in TDR0 for uplink transfer and informed the peripheral processor by writing the address (hp0_4) at the TDR0 head pointer offset in the HPDA (0). After the peripheral processor has successfully transmitted the data for TD0, it updates the TPA entry (0) by writing a new tail pointer address (tp0_1). When the peripheral processor updates the appropriate TPA entry, the host can free the corresponding data buffer from memory.

Similarly, as shown, the host has queued two (2) TDs in TDR1 for downlink transfer and informs the peripheral process device by writing hp1_2 at offset 1 in HPDA. Once the peripheral processor consumes these TDs, it will update TPA to inform the host.

In some implementations, the TDs may be "aggregated" into a larger scatter-gather TD to support so-called "scatter-gather" behavior for large I/O transfers (e.g., each procedure-call sequentially writes data from multiple buffers to a single data stream or reads data from a data stream to multiple buffers; the so-called "scatter/gather" refers to the process of gathering data from, or scattering data into, the given set of buffers.)

Figure 8:
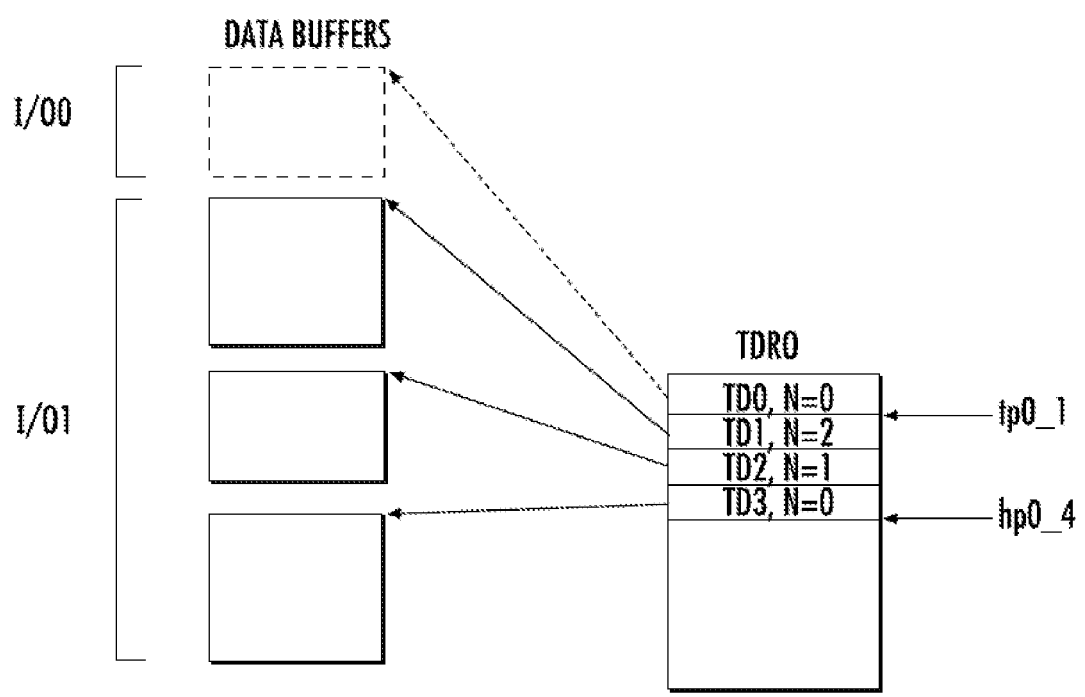
FIG. 8 is a logical representation of one exemplary scatter-gather input/output (I/O) transfer, useful in conjunction with various described embodiments.

FIG. 8 illustrates one exemplary scatter-gather TD which is described by three (3) TDs according to an exemplary "scatter-gather" scheme. Each TD indicates the remaining count of TDs in the aggregate scatter-gather TD. For example, as shown, I/O1 includes TD1 which continues to TD2 (two (2) TDs remain e.g., N=2), and TD2 continues to TD3 1 (one (1) TD remains N=1). Each TD contains a pointer to the data buffer in host memory (indicating the address to be accessed by the peripheral to perform the data transfer) and a size field (indicating the size of the data transfer). For uplink TDRs, the size field is read-only for the peripheral, whereas for downlink TDRs the size field may be read/write for the peripheral. During a downlink transfer, the peripheral reads the size field to determine the maximum size of the buffer available. After the downlink transfer, the peripheral may update the size field with the actual size of data written into the buffer.

Figure 9:
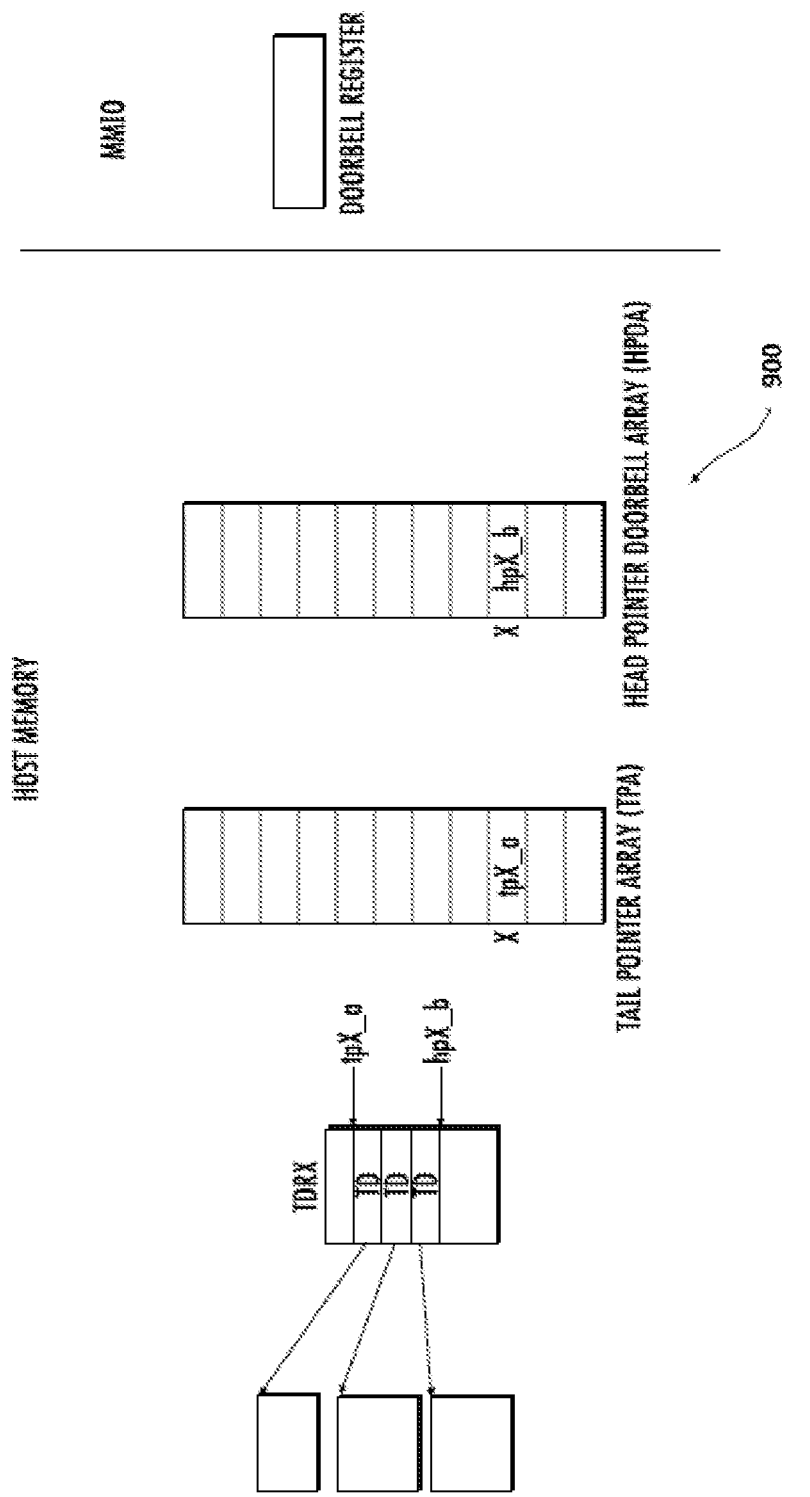
FIGS. 9-11 are logical representations of one exemplary transfer descriptor ring (TDR) at various stages of processing, useful in conjunction with various described embodiments.
Figure 10:
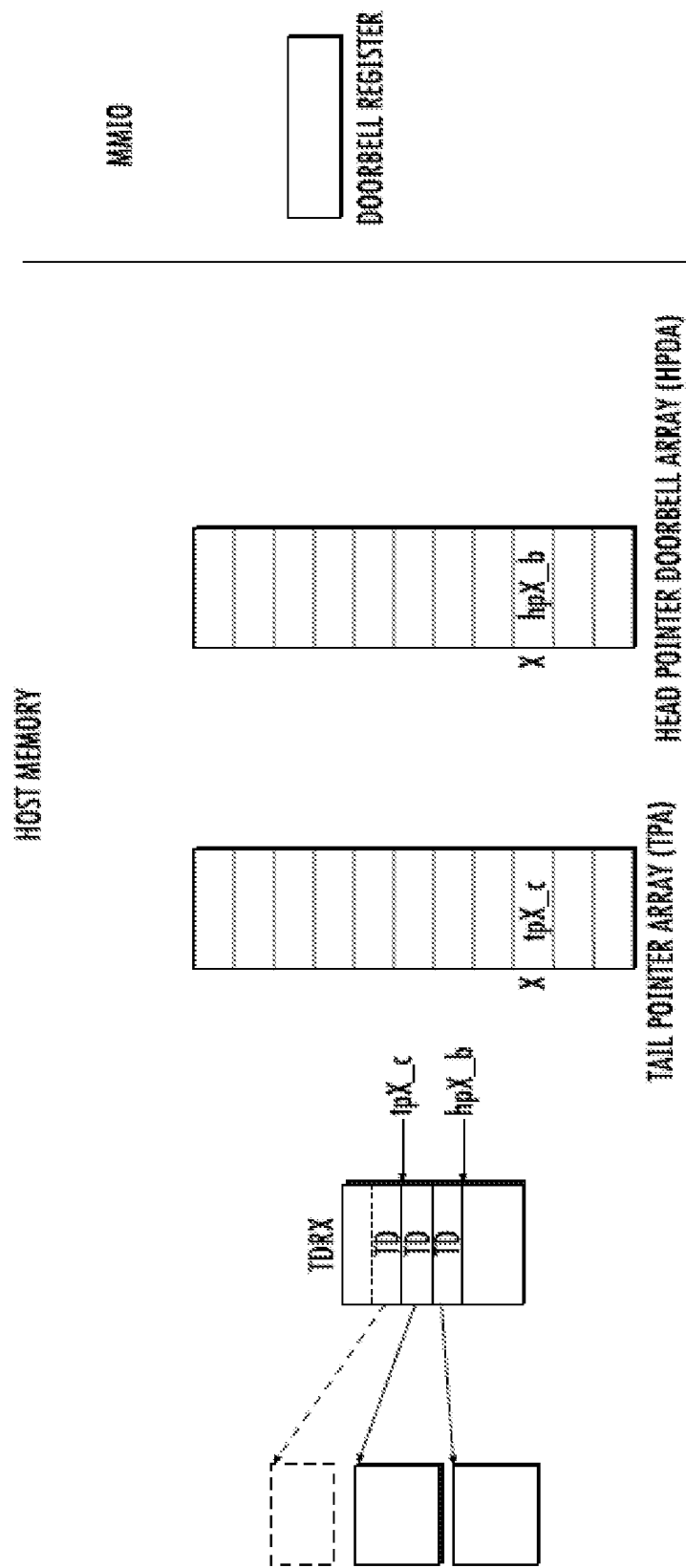
Figure 11:
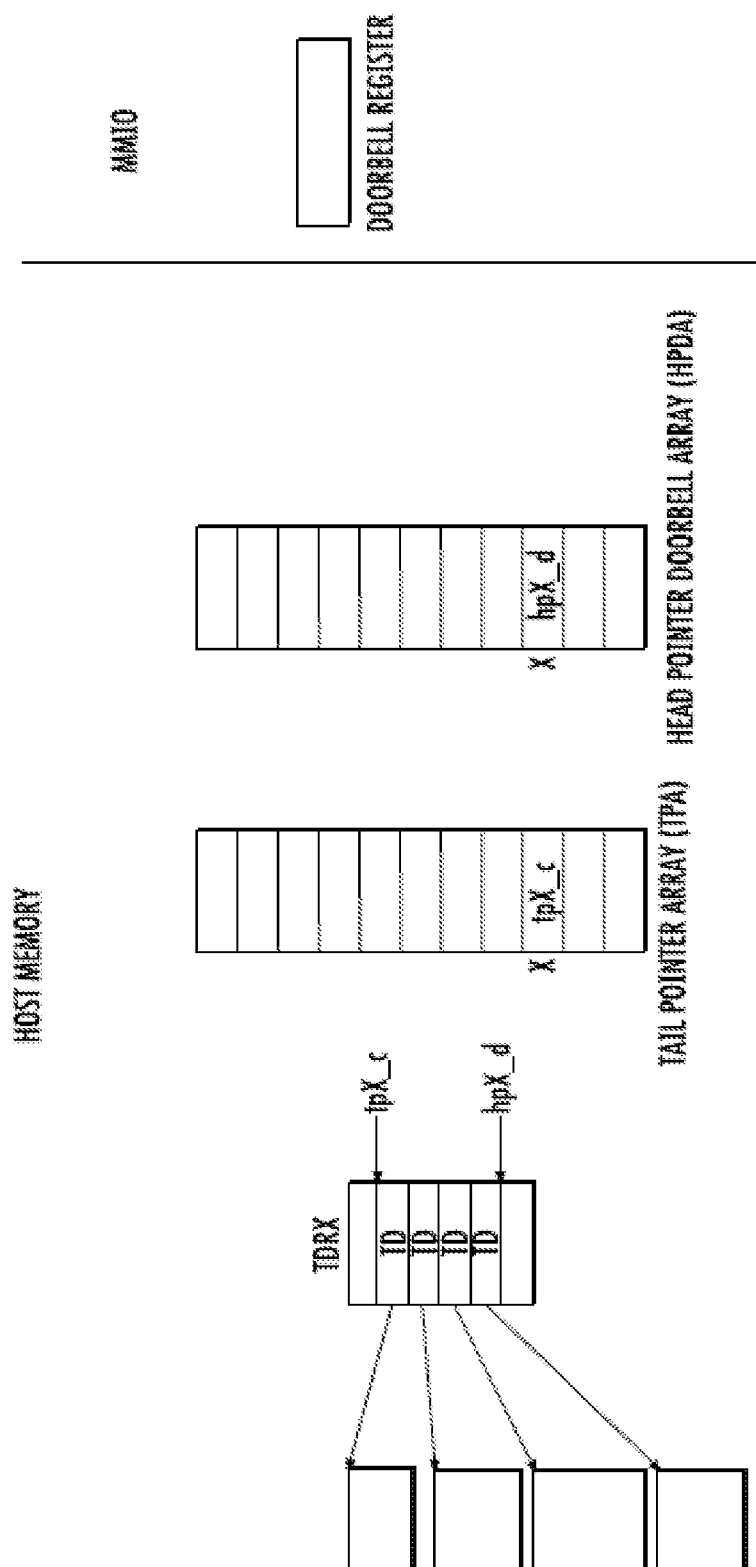

FIGS. 9-11 illustrate exemplary TDR (TDRX) transactions which support a "pipe" (pipeX, where X is the pipe number). As shown in FIG. 9, the TDR can contain multiple TDs, and the TDR state is described by the values of head pointer and tail pointer. The head pointer (hpX_b) points to the next empty slot in TDRX, and the tail pointer (tpX_a) points to the current location in TDRX (i.e., the location the peripheral will process next). As previously noted, when the head pointer equals the tail pointer, the ring is empty. Any TD between the tail pointer and head pointer is controlled by the peripheral processor. While the following scheme is based on a mutually exclusive control (i.e., when the host controls a memory, the peripheral cannot write to the memory and vice versa), those of ordinary skill in the related arts, given the contents of the present disclosure, will readily appreciate that other forms of shared access may be substituted with equal success.

FIG. 10 depicts the exemplary TDR after the peripheral processor has completed processing a TD. Specifically, as shown, once the peripheral processor has completed a TD, it updates the TD and the TPA with the address of the next TD to be processed, followed by a generation of an MSI. Responsive to the MSI, the host processor frees the TD and indicates successful completion to the client service.

FIG. 11 depicts the exemplary TDR queuing additional TDs for subsequent processing. As shown, when the host processor queues a new buffer, it checks whether there is an entry available in the TDR. Where there is an entry, the host processor populates the TD at the address pointed to by the head pointer, and then the head pointer value is updated. Thereafter the host processor updates the HPDA with the new head pointer value, which notifies the peripheral processor of the change.

Figure 12:
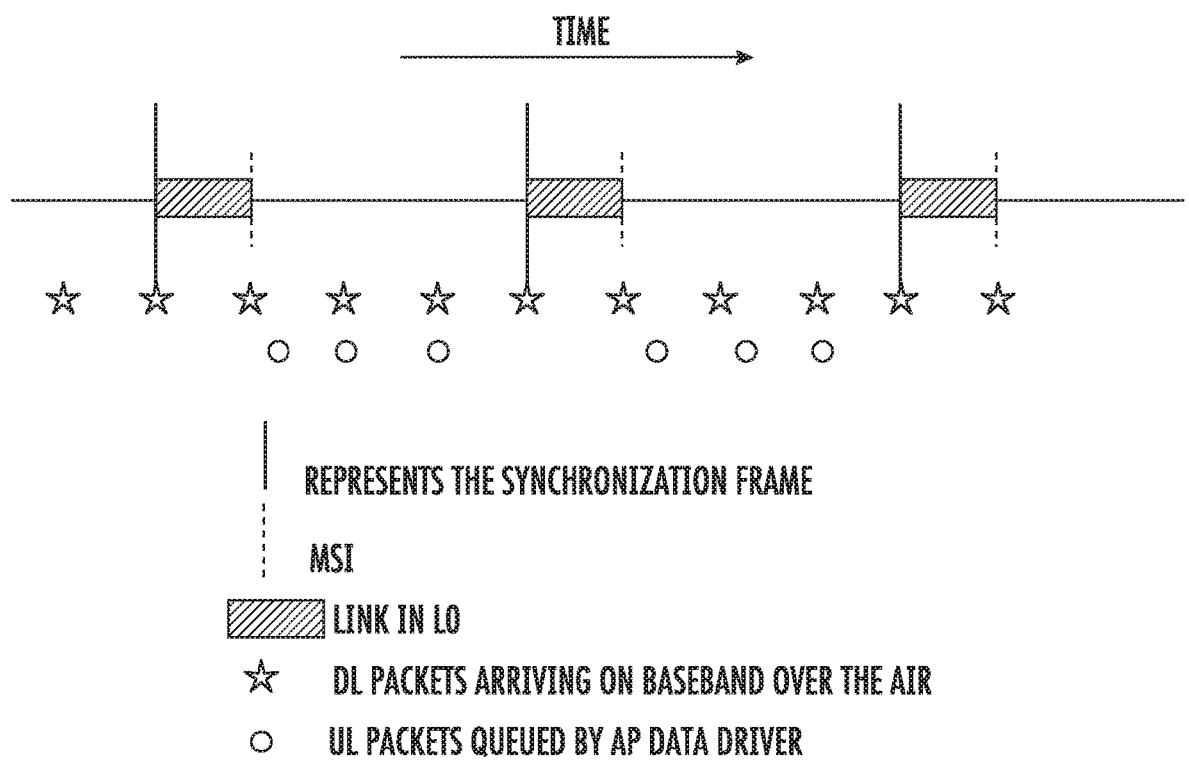
FIG. 12 is a graphical representation of the exemplary IPC link activity as compared to the radio uplink and downlink transfers, when viewed from the same time reference, in accordance with the principles described herein.

FIG. 12 is a graphical representation of the exemplary IPC link activity as compared to the radio uplink and downlink transfers, when viewed from the same time reference. As shown in FIG. 12, downlink packets (each one indicated by a star symbol) arrive on the baseband processor 102B via the radio link at various times, while uplink packets (each one indicated by a circle symbol) are queued by the application processor 102A at various times. At each synchronization frame interval (indicated by the longer vertical lines) the IPC link 104 is enabled for the transfer (e.g., state L0 302). While the link is enabled for transfer (indicated by the thick horizontal line), the queued uplink and downlink data packets are transferred. Once the queued uplink and downlink data packets have been successfully transferred, the baseband processor 102B generates a MSI (indicated by the shorter vertical line); thereafter the IPC link can transition to a lower power state (e.g., state L1.2) until the next synchronization frame.

Accumulated Downlink Data—

Under certain conditions, the downlink radio packets queued by the baseband processor 102B result in more accumulated data than can be sent over the IPC link in a single synchronization frame. Specifically, the application processor 102A may not have enough buffers queued in the downlink path for the baseband processor 102B to transfer all of its queued downlink data. For example, consider a scenario where the baseband processor has accumulated up to six (6) MB (megabytes) of radio downlink data to be sent to the application processor in the downlink TD, but where the application processor has only 450 KB of active read buffers queued for the downlink path. Under the aforementioned synchronized uplink/downlink transfer mechanism, the IPC link would require 48 ms to complete the transfer.

Figure 13:
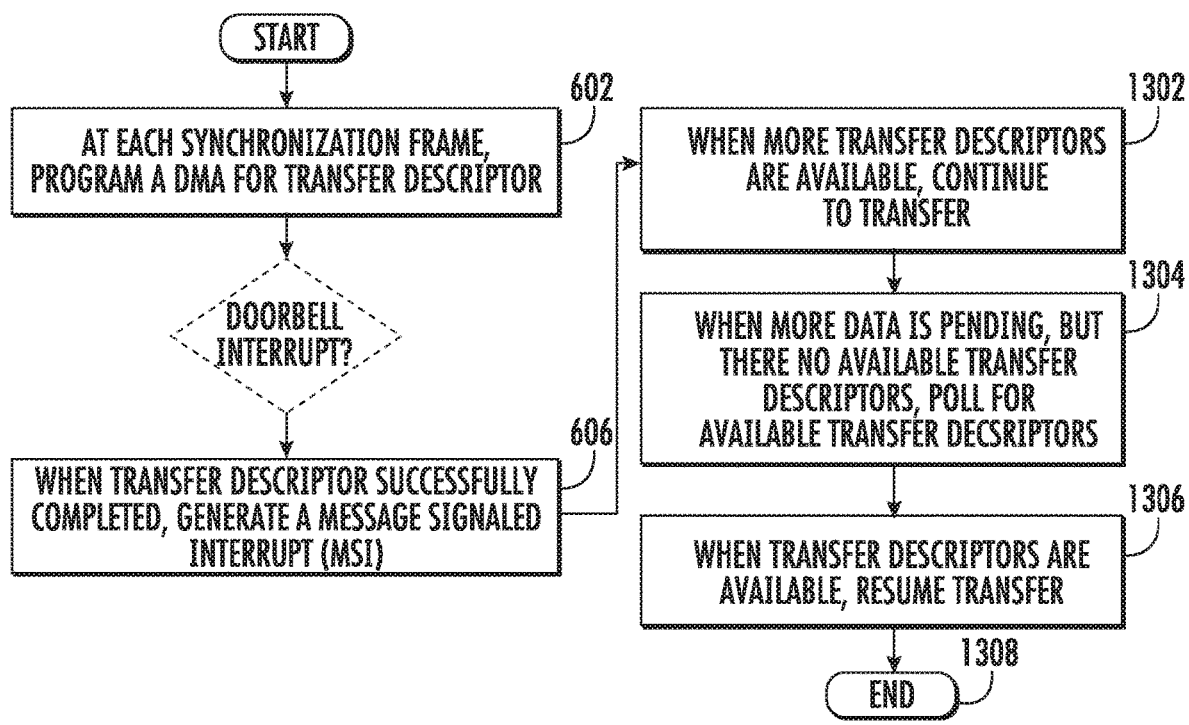
FIG. 13 is a logical flow diagram of an exemplary method enabling the baseband processor to handle accumulated data, useful in conjunction with various embodiments described herein.

FIG. 13 illustrates a logical flow diagram of a method 1300 enabling the baseband processor to handle accumulated data. Specifically, the method 1300 is a scheme for sending more data to the PCIe IPC driver than the available buffers in the cached TDs.

The initial steps of the method 1300 are identical to the baseband processor's portion of the exemplary method for implementing a synchronized multi-directional transfer, as described in FIG. 6 (see supra). In particular, during one synchronization frame the baseband processor sends one synchronization frame worth of buffered data (e.g., 225 KB of downlink data) to the application processor (step 602), and generates an MSI for the AP (step 606).

At step 1302 of the method 1300, when the baseband has more TDs cached for the downlink pipe after a normal synchronization frame worth of data, then the baseband processor will continue to send data to application processor for as long as the cached TDs are available. In one variant, the baseband processor additionally generates a second MSI after a de-bounce duration (e.g., 1 ms) from the previous MSI. As a brief aside, the AP continuously replenishes TDs for downlink transfers; however, the second MSI indicates that more TDs have been consumed by BB, thereby allowing the AP to process the additional completions. In some variants, the baseband uses a 1 ms de-bounce timer, so as to reduce the interrupt load on the AP (i.e., allowing the AP to service each completed TD).

At step 1304 of the method 1300, if the baseband runs out of cached TDs and there is more pending DL data, then the baseband processor polls the head pointer doorbell array for new TDs queued by the AP.

At step 1306 of the method 1300, when additional uplink/downlink TDs become newly available (e.g., the AP has completed previous TDs and replenished new TDs), then the baseband processor can transfer the queued data from/to the buffers associated with the additional TDs, complete the TDs and update the tail pointer, in accordance with the aforementioned schemes for processing TDs. In one variant, the baseband processor generates additional MSIs after the de-bounce duration (e.g., 1 ms) from each previous MSI.

The application processor is expected to process and complete TDs faster than the baseband; thus, in one embodiment, an error condition may be flagged when the baseband processor has data pending for transfer but the application processor has not replenished a TD. In these circumstances, the baseband processor should stop processing until the next doorbell interrupt from the application processor (that signals an available TD), to resume operation (step 1308). Alternative embodiments may perform more complex error checking and/or management processes.

Handling accumulated downlink data is primarily driven by the baseband processor based on its queued radio downlink data; however, the application processor controls the IPC link system resources. Thus, in one embodiment, the application processor is configured to complete TDs and queue new read buffers whenever it receives an MSI from the baseband.

In one variant, prior to updating the head pointer doorbell array, the application processor checks the transfer descriptor ring (TDR) to determine whether the downlink pipe is empty. When the TDR is empty, the application processor can use a shorter timer to send doorbells to the baseband processor. The shorter timer reduces unnecessary inactivity on the baseband processor.

Flow Control Optimizations—

In some embodiments, the application processor network stack determines the link condition based on the amount of data sitting in the uplink data pipes. Accordingly, in one exemplary embodiment the application processor may implement so called "Active Queue Management" (AQM). For AQM to work properly, the application processor must have accurate knowledge of the amount of uplink data. Since the exemplary synchronized uplink/downlink transfer necessarily introduces some delay latency in uplink data; in order to minimize the effects of the uplink buffer certain variants may minimize the size of the uplink buffer on the baseband.

In some variants, the baseband processor maintains a separate data queue for each data session or interface (PDP). In one exemplary variant, each data queue has an upper and a lower threshold, which are configured to identify incipient overflow/underflow conditions. For example, when a queue accumulates more data than the upper threshold limit (i.e., signaling a potential overflow), then the baseband processor can preemptively transmit a 'flow control enable' command to the application processor for the given data session or interface. Flow control prevents the data queue from accumulating more data, until the existing data transaction has completed. When the data queue falls below a lower threshold limit, the baseband transmits a 'flow control disable' command to the application processor to resume data transactions. In some variants, the application processor can inform the baseband processor about an amount of data pending in the uplink AQM queues via control commands.

In one exemplary embodiment, the flow control commands to enable and disable flow control are transacted over the IPC PCIe link. In one exemplary variant, the flow control messages use the same synchronization frame data structure as the uplink/downlink data. In such implementations, the worst case scenario between the baseband transmitting a flow control command, and the application processor enabling flow control is the synchronization frame size (e.g., 4 ms).

In some embodiments, the application processor data driver can queue at most one synchronization frame worth of data with the IPC PCIe driver for uplink data. Thus, once the AP receives a flow control command, flow control will be enabled in the next synchronization frame. For example, if the baseband processor enables flow control, data that has already been queued for the uplink transfer still needs to be consumed. Similarly, if the baseband disables flow control, the AP starts queuing data for uplink transfer in the next synchronization frame.

In order to improve throughput in the uplink direction, in some variants the baseband can buffer more data than can be transferred in the synchronization frame. In one such case, the buffer is configured to store at least twice the amount of data which can be transferred in a synchronization frame. In some variants, the lower threshold is set at double the amount of data of a synchronization frame and the upper threshold is set to three times the data of a synchronization frame.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A processor configured to synchronize transfers with another processor over a bus interface, the processor being further configured to:
   generate one or more first data structures, each of the one or more first data structures being associated with uplink payload data stored in a storage device, the storage device being accessible by the processor and the another processor;
   initiate a timer;

based at least on a determination that the another processor has processed all of the one or more first data structures within a first time interval, reset the timer; and based at least on a determination that the another processor has not processed all of the one or more first data structures within the first time interval, transmit an interrupt signal to the another processor, wherein the determination that the another processor has not processed all of the one or more first data structures within the first time interval is based at least on an expiry of the timer.

2. The processor of claim 1, wherein the interrupt signal is configured to cause the another processor to retrieve the one or more first data structures.

3. The processor of claim 1, wherein the timer is associated with a second time interval that is larger than the first time interval, thereby ensuring that the expiry of the timer will not occur unless the another processor has not processed all of the one or more first data structures within the first time interval.

4. The processor of claim 1, wherein the first time interval is associated with a synchronization frame, the synchronization frame comprising a predetermined time interval during which the bus interface is in an active power state.

5. The processor of claim 4, further configured to:
generate one or more second data structures each associated with downlink payload data that has been accumulated by the another processor for transmission to the processor; and
cause simultaneous transfer of the uplink payload data and the downlink payload data during the synchronization frame;
wherein the uplink payload data comprises data that has been accumulated by the processor for transmission to the another processor.

6. The processor of claim 1, wherein the generation of the one or more first data structures comprises generation of one or more transfer descriptors and placement of the one or more transfer descriptors in at least one data structure array, the at least one data structure array residing in the memory device and being configured to hold a plurality of transfer descriptors.

7. The processor of claim 1, wherein:
the processing of the one or more first data structures comprises an uplink transfer of the uplink payload data associated with the one or more first data structures, from the processor to the another processor, during the first time interval; and
the uplink transfer of the uplink payload data comprises a direct memory access (DMA) operation of the uplink payload data by the another processor.

8. The processor of claim 1, wherein:
the processor comprises a host-side applications (AP) processor;
the another processor comprises a baseband (BB) processor, the BB processor comprising a wireless modem; and
the bus interface comprises an inter-processor communication (IPC) link configured to enable data transmission between the AP processor and the BB processor.

9. An inter-processor communication (IPC) link apparatus configured to enable synchronized multi-directional data transfer between a first processor device and a second processor device by at least:
enabling the first processor device to queue a plurality of data structures to a plurality of data structure arrays, the data structure arrays residing in a storage device accessible by the first and second processor devices;
enabling the second processor device to, during at least a prescribed time interval, retrieve data from the storage device based at least on data contained in a first portion of the plurality of data structures; and
enabling the second processor device to, during at least said prescribed time interval, transfer data to the first processor device based at least on information contained in a second portion of the plurality of data structures,
wherein the retrieval of the data and the transfer of the data occur only during said prescribed time interval, and
wherein the IPC link apparatus is configured to be in an active power state during said prescribed time interval and in a second power state outside said prescribed time interval, the second power state comprising a reduced consumption of electrical power relative to the active power state.

10. The IPC link apparatus of claim 9, further configured to enable the synchronized multi-directional data transfer by causing the first processor device to:
establish the prescribed time interval via a timer;
receive an interrupt signal from the second processor device responsive to the second processor device completing the retrieval of the data and the transfer of the data; and
based on the interrupt signal, reset the timer.

11. The IPC link apparatus of claim 9, wherein an IPC link created by the IPC link apparatus is configured to operate utilizing at least a Peripheral Component Interconnect Express (PCIe) bus standard protocol.

12. The IPC link apparatus of claim 9, wherein:
the first portion of the plurality of data structures comprises one or more first transfer descriptors, each of the one or more first transfer descriptors comprising an address of a buffer in the storage device, the buffer comprising uplink data; and
the second portion of the plurality of data structures comprises one or more second transfer descriptors associated with downlink data accumulated by the second processor device.

13. A method for performing a synchronized multi-directional data transfer between a first device and a second device, the method comprising:
reading one or more first transfer data structures residing at a data storage apparatus associated with the first device, the data storage apparatus being accessible by the first device and the second device;
during a synchronization frame interval, and based at least on the one or more first transfer data structures, causing transmission of first accumulated data to the first device over a communications link;
reading one or more second transfer data structures residing at the data storage apparatus; and
during said synchronization frame interval, and based at least on the one or more second transfer data structures, obtaining second data accumulated at the data storage apparatus.

14. The method of claim 13, wherein:
the second device comprises an independently operable baseband processor, the independently operable baseband processor comprising a wireless modem; and
the first device comprises an independently operable applications processor in data communication with the baseband processor.

15. The method of claim 13, further comprising:
implementing a physical bus interface between the first device and the second device; and
causing the physical bus interface to transition from one power state to a higher power state during said synchronization frame interval.

16. The method of claim 13, further comprising:
waiting for the first device to start a timer, wherein the causing transmission of the first accumulated data and the obtaining the second accumulated data occur subsequent to the start of the timer; and
transmitting an interrupt signal to the first device subsequent to completion of the obtaining of the data, the interrupt causing the first device to reset the timer.

17. The method of claim 13, further comprising:
waiting for the first device to start a timer;
receiving an interrupt signal from the first device subsequent to expiration of the timer;
retrieving additional one or more transfer data structures; and
based on the retrieved additional one or more transfer data structures, performing at least one of (i) causing transmission of additional first accumulated data or (ii) obtaining additional second accumulated data.

18. The method of claim 13, wherein the obtaining of the data accumulated at the data storage apparatus comprises a direct memory access (DMA) of the data storage apparatus.

* * * * *